United States Patent
Mantin et al.

(10) Patent No.: US 11,797,999 B1
(45) Date of Patent: Oct. 24, 2023

(54) DETECTING FRAUDULENT TRANSACTIONS

(71) Applicant: INTUIT INC., Mountain View, CA (US)

(72) Inventors: Itsik Yizhak Mantin, Shoham (IL); Sapir Porat, Hod Hasharon (IL)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 18/059,033

(22) Filed: Nov. 28, 2022

(51) Int. Cl.
*G06Q 40/00* (2023.01)
*G06Q 20/40* (2012.01)
*G06N 20/00* (2019.01)

(52) U.S. Cl.
CPC ......... *G06Q 20/4016* (2013.01); *G06N 20/00* (2019.01)

(58) Field of Classification Search
CPC ............................ G06Q 20/4016; G06N 20/00
See application file for complete search history.

(56) References Cited

U.S. PATENT DOCUMENTS

| | | | | |
|---|---|---|---|---|
| 2017/0206466 A1* | 7/2017 | Zoldi | ...................... | G06N 20/00 |
| 2019/0087821 A1* | 3/2019 | Jia | ...................... | G06Q 20/4016 |
| 2021/0117851 A1* | 4/2021 | Jumper | .................. | G06N 20/00 |
| 2021/0248448 A1* | 8/2021 | Branco | .................. | G06Q 40/12 |
| 2021/0312451 A1* | 10/2021 | Allbright | ................ | G06N 20/00 |
| 2021/0312455 A1* | 10/2021 | Venturelli | ............... | G06Q 20/34 |
| 2022/0036219 A1* | 2/2022 | Assefa | .................... | G06N 5/042 |
| 2022/0067041 A1* | 3/2022 | Wright | .............. | G06F 16/24556 |
| 2022/0180367 A1* | 6/2022 | Zhu | ........................ | G06N 3/044 |
| 2022/0261795 A1* | 8/2022 | Perkins | .................. | G06Q 20/40 |
| 2022/0358508 A1* | 11/2022 | Pandillapalli | ........ | G06Q 20/389 |

FOREIGN PATENT DOCUMENTS

| | | | | | |
|---|---|---|---|---|---|
| CN | 109767225 | * | 5/2019 | ............. | G06Q 20/40 |
| WO | WO-2020097277 A1 | * | 5/2020 | ............. | G06F 17/18 |
| WO | WO-2022177915 A1 | * | 8/2022 | ........... | G06K 9/6257 |

OTHER PUBLICATIONS

Jiang et al., "Credit Card Fraud Detection: A Novel Approach Uswing Aggregation Strategy and Feedback Mechanism," IEEE Internet of Things Journal, vol. 5, No. 5, Oct. 2018 (Year: 2018).*

(Continued)

*Primary Examiner* — Abhishek Vyas
*Assistant Examiner* — William B. Bunker
(74) *Attorney, Agent, or Firm* — Patterson + Sheridan, LLP

(57) ABSTRACT

The present disclosure provides techniques for recommending vendors using machine learning models. One example method includes receiving transaction data indicative of a transaction, identifying, based on the transaction data, an associated merchant of one or more merchants and an associated time window of one or more time windows, receiving historical transaction data indicative of one or more historical transactions, wherein the one or more historical transactions are associated with the associated merchant and the associated time window, generating features based on the transaction data and the historical transaction data, and determining, using a classification model, that the transaction is fraudulent, based on the generated features.

17 Claims, 4 Drawing Sheets

(56) References Cited

OTHER PUBLICATIONS

Wang et al., "LAW: Learning Automatic Windows for Online Payment Fraud Detection," IEEE Transactions on Dependable and Secure Computing, vol. 18, No. 5 Sep./Oct. 2021 (Year: 2021).*

Branco et al., "Interleaved Sequence RNNs for Fraud Detection," arXiv:2002.05988v2 [es.LG] 2020 (Year: 2020).*

Lucas et al., "Credit card fraud detection using machine learning: A survey," arXiv:2010.06479v1 [es. LG] 2020 (Year: 2020).*

Mao et al., "Adaptive Fraud Detection System Using Dynamic Risk Features," arXiv:1810.04654v1 [stat.AP] 2018 (Year: 2018).*

\* cited by examiner

DETECTING FRAUDULENT TRANSACTIONS

INTRODUCTION

Aspects of the present disclosure relate to detecting fraudulent transactions.

Electronic transactions have become increasingly popular, particularly as more and more consumers and businesses utilize online exchange platforms or online payment services. An electronic transaction can indicate a consumer (e.g., a buyer) and a merchant (e.g., a seller). In many cases, malicious parties (e.g. defrauders) can steal payment information from other people and attempt to make financial gains using the stolen payment information. For example, a malicious party can pretend to be a legitimate consumer and make purchases using the payment information stolen from the consumer. In another example, a malicious party can pretend to be a legitimate merchant and place charges through stolen payment information.

However, electronic transactions often do not include enough information to help determine whether a transaction is fraudulent. In many cases, it is difficult for a software application to automatically determine if a transaction is from a malicious party or a consumer. For example, consumers can forget their credentials or make honest mistakes, and will try the same payment method multiple times or try different payment methods. However, these behaviors can also be seen from fraudulent activities performed by malicious parties, and a software application may be unable to tell the difference using exiting fraud detection techniques.

Accordingly, improved systems and methods are needed for detecting fraudulent transactions.

BRIEF SUMMARY

Certain embodiments provide a method for detecting fraudulent transactions. The method generally includes receiving transaction data indicative of a transaction, identifying, based on the transaction data, an associated merchant of one or more merchants and an associated time window of one or more time windows, receiving historical transaction data indicative of one or more historical transactions, wherein the one or more historical transactions are associated with the associated merchant and the associated time window, generating features based on the transaction data and the historical transaction data, wherein generating the features comprises, identifying a set of transactions associated with a given payment identifier in the one or more historical transactions and the transaction, and indicating, in the generated features, that the set of transactions are successful if at least one transaction in the set of transactions was successful, and determining, using a classification model, that the transaction is fraudulent, based on the generated features.

Another embodiment provides a system for detecting fraudulent transactions. The system generally includes a memory including computer-executable instructions and a processor configured to execute the computer-executable instructions. Executing the computer executable-instructions causes the system to receive transaction data indicative of a transaction, identify, based on the transaction data, an associated merchant of one or more merchants and an associated time window of one or more time windows, receive historical transaction data indicative of one or more historical transactions, wherein the one or more historical transactions are associated with the associated merchant and the associated time window, generate features based on the transaction data and the historical transaction data, wherein generating the features comprises, identifying a set of transactions associated with a given payment identifier in the one or more historical transactions and the transaction, and indicating, in the generated features, that the set of transactions are successful if at least one transaction in the set of transactions was successful, and determine, using a classification model, that the transaction is fraudulent, based on the generated features.

Still another embodiment provides a non-transitory computer readable medium for detecting fraudulent transactions. The non-transitory computer readable medium generally includes instructions to be executed in a computer system, wherein the instructions when executed in the computer system perform a method for detecting fraudulent transactions on a computing device requiring minimal run time processing. The method generally includes receiving transaction data indicative of a transaction, identifying, based on the transaction data, an associated merchant of one or more merchants and an associated time window of one or more time windows, receiving historical transaction data indicative of one or more historical transactions, wherein the one or more historical transactions are associated with the associated merchant and the associated time window, generating features based on the transaction data and the historical transaction data, wherein generating the features comprises, identifying a set of transactions associated with a given payment identifier in the one or more historical transactions and the transaction, and indicating, in the generated features, that the set of transactions are successful if at least one transaction in the set of transactions was successful, and determining, using a classification model, that the transaction is fraudulent, based on the generated features.

The following description and the related drawings set forth in detail certain illustrative features of the various embodiments.

BRIEF DESCRIPTION OF DRAWINGS

The appended figures depict certain features of the various aspects described herein and are not to be considered limiting of the scope of this disclosure.

DETAILED DESCRIPTION

Figure 1:
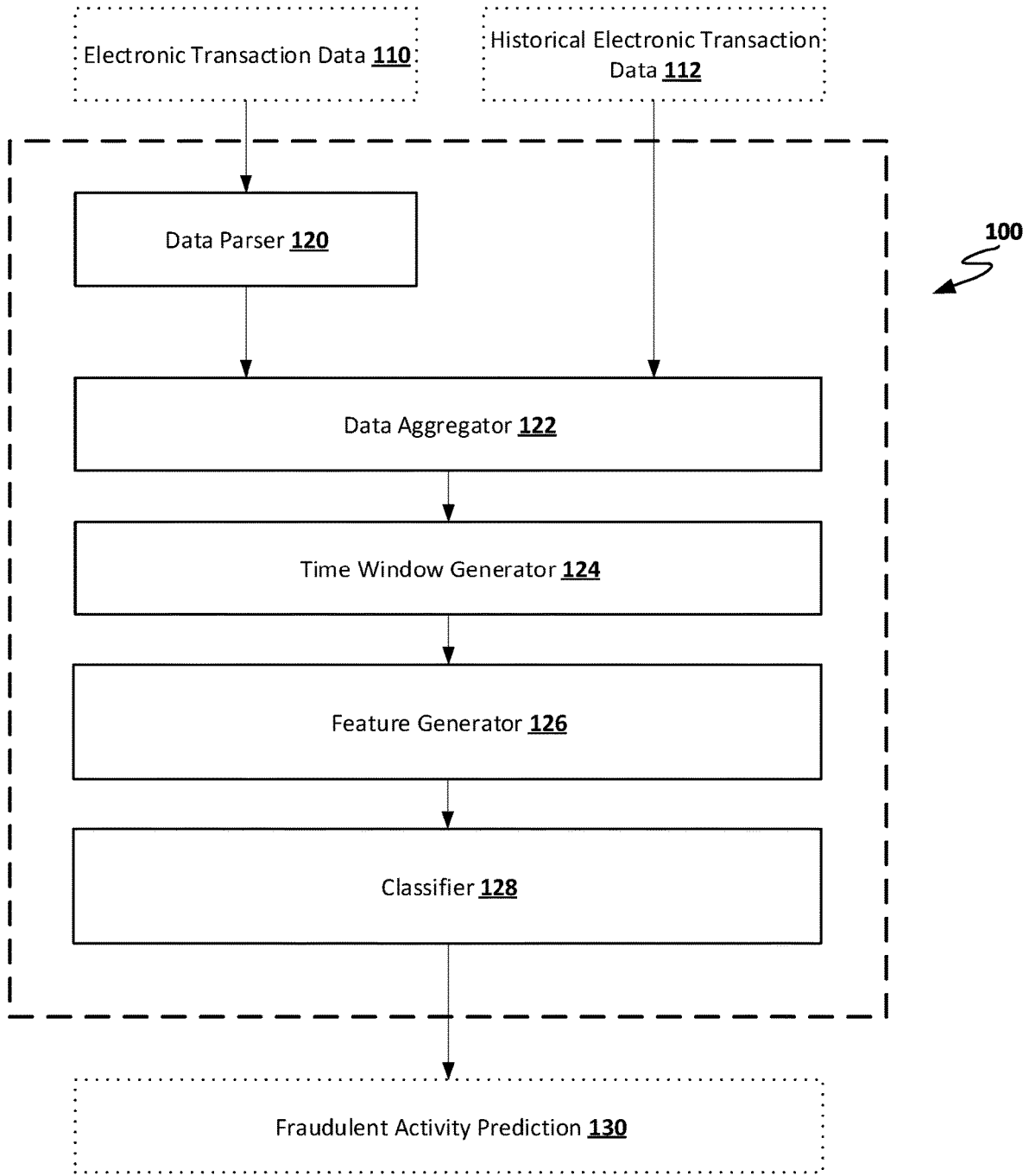
FIG. 1 depicts an example fraud detector for detecting fraudulent transactions.

Aspects of the present disclosure provide apparatuses, methods, processing systems, and computer-readable mediums for detecting fraudulent transactions.

In fraudulent electronic transactions, defrauders can pretend to be either consumers or merchants. For example, a defrauder can pretend to be a consumer and make purchases from legitimate merchants using stolen payment information, or pretend to be a merchant and place charges on legitimate consumers through stolen payment information. The defrauders can have behaviors similar to honest mistakes, such as trying the same payment method multiple times or trying different payment methods within a short duration. Existing automatic fraud detection methods performed by software applications are insufficient for distinguishing fraudulent activities from honest mistakes made by consumers or merchants. Embodiments of the present disclosure address these deficiencies in electronic transactions and resulting limitations in software applications by utilizing historical transaction data that includes historical transactions of payment information associated with different merchants within one or more time windows for detecting fraudulent transactions that cannot be easily deduced from electronic transactions alone.

An electronic transaction can be aggregated with historical electronic transactions sharing the same associated merchant identifier (e.g., an associated merchant ID). Similarly, one or more time windows can be generated for each merchant, where each time window can include zero or more transactions. Accordingly, each transaction in the aggregated transactions can be assigned to a different time window, if a transaction has a timestamp that falls within the time window.

Transactions in each time window can be used to generate features for the time window. Some heuristics can help to design features to be generated. For example, defrauders usually attempt multiple payment methods (e.g., credit cards) once instead of one payment method multiple times. In addition, in some malicious activities (e.g., card stuffing), payment methods attempted can have a high error rate. Furthermore, some error codes can indicate increased fraud risk, while some other error codes can indicate reduced fraud risk. Accordingly, features can include a number of transactions in the time window, a number of distinct payment identifiers in the time window, deltas between timestamps of consecutive transactions in the time window, a number of transactions associated with a particular error code in the time window, and/or a number of distinct payment identifiers whose associated transactions are associated with a particular error code in the time window. Such volumetric analysis within a time window allows for closer examination of suspicious activities within a particular duration.

In addition, statuses of some transactions can be updated. For example, a legitimate consumer can make honest mistakes (e.g., typos or wrong passcodes). The consumer can attempt one payment method (e.g., a credit card) several times before the mistake is corrected and the transaction is successful. This can create a sequence of similar transactions sharing the same payment method and the same associated merchant. To account for the honest mistakes, if a sequence of similar transactions is included in a time window and one or more transactions in the sequence indicate success, the statuses of the remaining transactions in the sequence can be automatically updated to indicate success as well.

Features from the one or more time windows can be utilized by different classification models. A different classification model can be built for each time window. For example, for a given associated merchant, there can be several classification models each of which is applied to a different time window. To aggregate the predictions of the classification models, an ensemble of classification models can be used, where the output of the ensemble can be the majority vote of the different classification models. This ensemble technique can help minimize fluctuation in the classification models when new data is received and generate more accurate and reliable predictions. Classification models can have higher weights assigned to features indicating higher risk of a transaction. If a transaction is predicted to be fraudulent, the prediction can be used to automatically alert a data source (e.g., a payment verification system) and/or automatically block future transaction requests from the merchant or the consumer.

By making predictions based on transactions included in different time windows and aggregating the predictions to form an ensemble of classification models, techniques described herein overcome deficiencies in existing techniques for computer-based fraud detection for electronic transactions. For example, while existing techniques may not allow a computing application to differentiate between fraud and honest mistakes by parties to transactions, techniques described herein allow a computing application to perform such differentiation based on the use of an ensemble of classification models that analyze particular features from different time windows. Furthermore, automatically updating the statuses of transactions based on a similar transaction that is successful can account for honest mistakes made by legitimate consumers and merchants and help minimize false positives in the predictions. Thus, embodiments of the present disclosure provide a technical improvement with respect to conventional techniques for detecting fraud in electronic transactions. Additionally, by avoiding false positives, techniques described herein avoid unnecessary utilization of computing resources that would otherwise occur in association with generating and handling such false positives. Embodiments of the present disclosure also improve security of electronic transactions by accurately predicting fraud and preventing processing of fraudulent transactions.

Example Fraud Detector for Detecting Fraudulent Transactions

FIG. 1 depicts an example fraud detector 100 for detecting fraudulent transactions. Fraud detector 100 can receive electronic transaction data 110 and historical electronic transaction data 112 as inputs and generate fraudulent activity prediction 130 as the output. Fraud detector 100 can be deployed either online or offline.

Electronic transaction data 110 and historical electronic transaction data 112 can indicate one or more transactions, such as in the form of electronic transaction records. Electronic transaction data 110 can include transactions to be processed by fraud detector 100 whereas historical electronic transaction data 112 can include processed transactions. Electronic transaction data 110 and historical electronic transaction data 112 can indicate information such as one or more associated merchant identifiers (e.g., merchant IDs), one or more payment identifiers (e.g., payment IDs), one or more timestamps of the one or more transactions, one or more statuses of the one or more transactions (e.g., success or failure), and/or one or more error codes associated with the one or more transactions. In some examples, electronic transaction data 110 is received from a data source, such as a payment verification system, whereas historical electronic transaction data 112 is retrieved from a database.

In some examples, when fraud detector 100 is deployed online, electronic transaction data 110 indicates one transaction, which is known as the current transaction. For simplicity, in the following discussion, fraud detector 100 is assumed to be deployed online, and electronic transaction data 110 indicates one current transaction.

Electronic transaction data 110 can be provided as inputs to data parser 120 to generate parsed information of the transaction indicated in electronic transaction data 110. Parsed information can include an associated merchant identifier (e.g., a merchant ID), a payment identifier (e.g., a payment ID), a timestamp of the transaction, a status of the transaction (e.g., success or failure), and/or an error code associated with the transaction, if available, as discussed above.

The associated merchant identifier of the current transaction in electronic transaction data 110 can be provided as input to data aggregator 122. Additionally, data aggregator 122 can take as inputs historical electronic transaction data 112. Data aggregator 122 can use the associated merchant identifier to select from historical electronic transaction data 112, a subset of transactions that share the same associated merchant (e.g., having the same associated merchant identifier) as the current transaction. The subset of transactions and the current transaction can be aggregated by (e.g., combined by) data aggregator 122 to generate aggregated transactions, which include past and current transactions related to the associated merchant. In some examples, aggregated transactions are used to update historical electronic transaction data 112.

The aggregated transactions can be provided as inputs to time window generator 124. Time window generator 124 can generate one or more time windows per associated merchant. The number and/or durations of time windows per merchant can be specified via hyperparameters. For example, a set of hyperparameters can specify a number of 3 time windows per merchant, including one 3-minute time window, one 4-minute time window, and one 10-minute time window. A time window can be reset upon the expiration of its duration (e.g., reset every 3 minutes for the 3-minute time window). Accordingly, a time window generated by time window generator 124 can be denoted with a start time, an end time, and/or a duration.

Time window generator 124 can select transactions in the aggregated transactions to be assigned to the one or more time windows. For each time window, time window generator 124 can determine whether a transaction falls within the time window, based on the timestamp of the transaction in the aggregated transactions. For example, if a transaction in the aggregated transactions has a timestamp within the time window (e.g., having a timestamp value greater or equal to the start time and less than the end time of the time window), the transaction can be included in the time window. Accordingly, each time window can include zero ore more transactions as assigned by time window generator 124.

Time window generator 124 can further update the statuses of a set of similar transactions based on the status of one transaction in the set. Time window generator 124 identify the set of similar transactions based on the payment identifiers of transactions. For example, a sequence of similar transactions sharing the same payment identifier can happen in a time window. One particular transaction in the sequence can have a status of "success" whereas the other transactions in the sequence can have a status of "failure". Accordingly, time window generator 124 can update the status of the other transaction in the sequence to "success", regardless of the temporal occurrence of the particular transaction (e.g., before or after the other transactions).

Updating the status of earlier transactions within a time window can help correct honest mistakes made by legitimate consumers or merchants (e.g., having typos or using wrong passcodes) and help reduce false positives during fraud detection. Usually, if a legitimate consumer makes an honest mistake, the consumer can attempt one payment method (e.g., a credit card) several times before the mistake is corrected and the transaction is successful. Details regarding assigning transactions to time windows and updating status of transactions can be found with respect to FIG. 2.

The transactions in the one or more time windows can be provided as inputs to feature generator 126. For each time window, feature generator 126 can generate a set of features based on the set of assigned transactions included in the time window. For example, feature generator 126 can generate as features one or more of a number of transactions in the time window, a number of distinct payment identifiers in the time window, deltas between timestamps of consecutive transactions in the time window, a number of transactions associated with a particular error code in the time window, and/or a number of distinct payment identifiers whose associated transactions are associated with a particular error code in the time window.

Some heuristics can be used to help design features to be generated. For example, defrauders usually attempt multiple payment methods (e.g., credit cards) once instead of one payment method multiple times. In addition, in some malicious activities (e.g., card stuffing), payment methods attempted can have a high error rate. Furthermore, some error codes can indicate increased fraud risk, while some other error codes can indicate reduced fraud risk.

Features generated by feature generator 126 can be provided to classifier 128 to generate fraudulent activity prediction 130. Fraudulent activity prediction 130 can be a binary indication (e.g., 1 for "yes" and 0 for "no") of whether the current transaction is fraudulent.

In some examples, classifier 128 includes a classification model universally applied to each time window.

In some examples, alternatively, classifier 128 includes a different classification model for each merchant. For example, if there are 10 merchants, classifier 128 can include 10 different classification models, where each classification model is applied to the time windows associated with the merchant. In some examples, classifier 128 includes a different classification model for each group of merchants. A group of merchants can share similar characteristics, such as industry, size, location, and/or the like. For example, if there are 4 merchant groups, classifier 128 can include 4 different classification models, where each classification model is applied to the time windows associated with the merchant(s) in the merchant group.

In some examples, alternatively, classifier 128 includes a different classification model for each time window. For example, if there are 10 merchants and 3 times windows per merchant, classifier 128 can include 30 different classification models. In another example, if there are 4 merchant groups and 3 times windows per merchant, classifier 128 can include 15 different classification models.

In some examples, if classifier 128 includes multiple classification models (e.g., is an ensemble of classification models), the results generated from the multiple classification models can be aggregated. In an example, classifier 128 includes 30 models which generates 30 results, including 19 1 s and 11 0 s. Accordingly, classifier 128 can take the majority vote from the 30 results, and generate the fraudulent activity prediction 130 as 1.

In some examples, classifier 128 includes a rule-based decision tree and/or a machine learning classification model, such as a decision tree classifier, a logistic regression model, a support vector machine, a random forest classifier, a gradient boosted tree classifier, a Gaussian Naive Bayes classifier or a neural network. In some examples, the classification model has higher weights related to features indicative of higher risk.

Following the example above, a rule based decision tree included in classifier 128 can have several nodes, whereas the nodes can indicate whether the number of transactions in the time window is greater than a threshold value, whether the number of distinct payment identifiers in the time window is greater than a threshold value, whether the deltas between timestamps of consecutive transactions in the time window are smaller than a threshold value, whether the number of transactions associated with a particular error code in the time window is greater than a threshold value, and/or whether the number of distinct payment identifiers whose associated transactions are associated with a particular error code in the time window is greater than a threshold value.

In some examples, if fraud detector 100 is performing online processing and fraudulent activity prediction 130 indicates the recent transaction is fraudulent, fraudulent activity prediction 130 can be provided by fraud detector 100 to the data source (e.g., the payment verification system) to block future transactions from the associated merchant and/or the payment identifier for a duration.

In certain embodiments, one or more classification models are trained using machine learning techniques to predict fraudulent activity. Training data may be generated based on historical electronic transaction data 112 and/or other historical electronic transaction data, and the training data may include features associated with previously-processed transactions associated with labels (e.g., assigned by one or more users) indicating whether the previously-processed transactions were fraudulent. In an example, training is a supervised learning process that involves providing training inputs representing features associated with transactions (e.g., numbers of transactions in a time window, numbers of distinct payment identifiers in a time window, deltas between timestamps of consecutive transactions in a time window, numbers of transactions associated with a particular error code in a time window, numbers of distinct payment identifiers whose associated transactions are associated with a particular error code in a time window, and/or the like) as inputs to the classification model. The classification model processes the training inputs and outputs predictions indicating whether transactions represented by the training inputs are likely to be fraudulent. Predictions may, in some embodiments, be in the form of probabilities. The predictions are compared to the known labels associated with the training inputs to determine the accuracy of the classification model, and the classification model is iteratively adjusted until one or more conditions are met. For instance, the one or more conditions may relate to an objective function (e.g., a cost function or loss function) for optimizing one or more variables (e.g., classification accuracy). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for the classification model, such as based on validation data and test data, as is known in the art. In some cases training, validation, and/or testing data is generated based on historical electronic transaction data 112. Data parser 120 may also be used in generation of training, validation, and/or testing data in some cases.

Once a classification model is trained using machine learning techniques, features of a current transaction may be provided as inputs to the machine learning model, and the model may output a prediction indicating whether the current transaction is likely to be fraudulent.

Example Process for Time Window Generation

Figure 2:
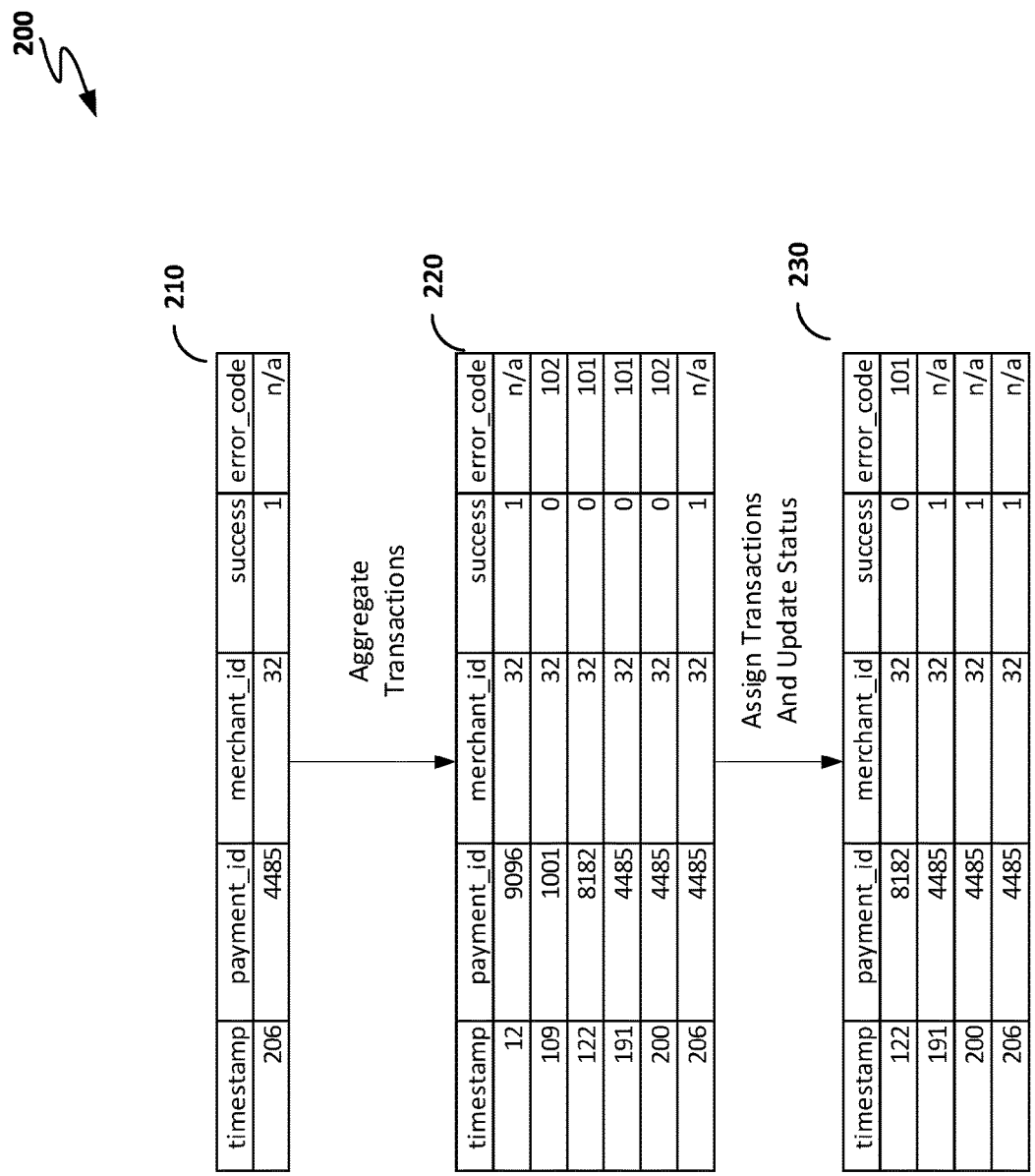
FIG. 2 depicts an example process for time window generation.

FIG. 2 depicts an example process 200 for time window generation. The time window can be generated by time window generator 124 as shown in FIG. 1. Process 200 can be carried out by a fraud detector, such as fraud detector 100 as shown in FIG. 1. Although FIG. 2 depicts transactions using tables, transactions in the time window can be represented using other appropriate data structures, such as lists, vectors, matrices, pandas DataFrames, or the like. Although the example illustrates a time window with a certain start time and a certain duration, process 200 can generate time windows with variable start times and variable durations. In addition, though the example illustrates specific transactions, process 200 can be applied to any transactions.

Process 200 can start by receiving recent transaction 210. Recent transaction 210 can be a parsed transaction generated by data parser 120 as shown in FIG. 1. As depicted, recent transaction 210 can indicate a timestamp for the transaction (as shown with the "timestamp" column), a payment identifier for the transaction (as shown with the "payment_id" column), an associated merchant identifier for the transaction (as shown with the "merchant_id" column), a status for the transaction (as shown with the "success" column, where a 1 indicates a successful transaction whereas a 0 indicates a failed transaction), and an error code for the transaction (as shown with the "error_code" column).

Process 200 can aggregate recent transaction 210 with transactions corresponding to recent transaction 210. Process 200 can select, using the associated merchant identifier (e.g., merchant_id 32) of recent transaction 210 from a log of historical transactions, corresponding transactions that share the same associated merchant identifier (e.g., merchant_id 32) as recent transaction 210. The log of historical transactions can be historical electronic transaction data 112 as shown in FIG. 1. Recent transaction 210 can be aggregated with (e.g., combined with) the corresponding transactions to generate aggregated transactions 220, similar to the operations of data aggregator 122 as discussed with respect to FIG. 1.

In this example, the time window has a duration of 2 minutes and has a start time at 120 s. Accordingly, the time window lasts from 120 s to 240 s. Based on the time window, process 200 can select transactions to be assigned to the time window. For example, the first two transactions of aggregated transactions 220 (e.g., represented by row 2 and row 3) have timestamps before the start time of the time window and is not assigned to the time window. Accordingly, the remaining transactions of aggregated transactions 220 (e.g., represented by rows 4 through 7) are within the time window and are assigned to the time window.

Process 200 can then identify a set of similar transactions sharing the same payment identifier (e.g., payment_id) and update the statuses of the set of similar transactions to generate updated transactions 230 to be included in the time window. In this example, a sequence of transactions with payment_id 4485 is in the time window, and the transaction with timestamp 206 indicates a status of success (e.g., column "success" is 1). Accordingly, process 200 can update the statuses of the sequence of transactions to indicate success (e.g., updating the "success" column of the sequence to be 1). In some examples, as depicted, after the update, the error codes of the sequence are also updated to be not available (e.g., changed to "n/a"). Updated transactions 230 can be provided as input to a feature generator, such as feature generator 126 to generate features used to detect fraud.

Example Operations for Predicting Attributes for Recipients

Figure 3:
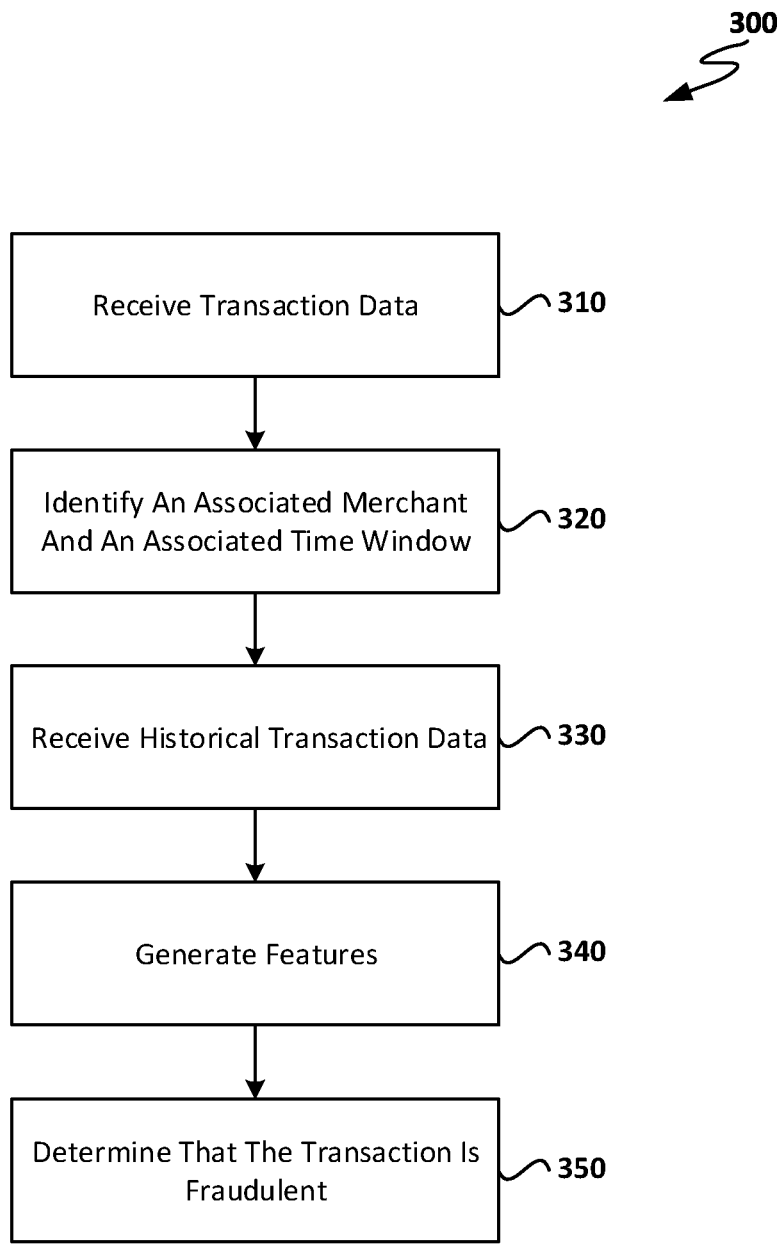
FIG. 3 is a flow diagram of example operations for detecting fraudulent transactions.

FIG. 3 is a flow diagram of example operations 300 for detecting fraudulent transactions. Operations 300 may be performed by a fraud detector, such as fraud detector 100 as illustrated in FIG. 1.

Operations 300 begin at 310, where transaction data indicative of a transaction is received. For example, the transaction data can be electronic transaction data 110 as illustrated in FIG. 1.

At 320, an associated merchant of one or more merchants and an associated time window of one or more time windows are identified based on the transaction data. For example, the associated merchant can be indicated via an associated merchant identifier and the time window can be generated by time window generator 124 as discussed with respect FIG. 1.

At 330, historical transaction data indicative of one or more historical transactions is received, wherein the one or more historical transactions are associated with the associated merchant and the associated time window. For example, the historical transaction data can be a subset of historical electronic transaction data 112 as shown in FIG. 1. The subset of historical electronic transaction data 112 can be selected by data aggregator 122 and time window generator 124 as discussed with respect FIG. 1.

In some embodiments, the transaction data or the historical transaction data comprises one or more of one or more associated merchant identifiers, one or more payment identifiers, one or more timestamps of the one or more transactions, one or more statuses of the one or more transactions, and/or one or more error codes associated with the one or more transactions.

At 340, features are generated based on the transaction data and the historical transaction data, wherein generating the features comprises, identifying a set of transactions associated with a given payment identifier in the one or more historical transactions and the transaction, and indicating, in the generated features, that the set of transactions are successful if at least one transaction in the set of transactions was successful. For example, features can be generated by feature generator 126 as shown in FIG. 1, where the he transaction data and the historical transaction data can be transaction included in an input time window to feature generator 126 as discussed with respect to FIG. 1. The set of transactions associated with a given payment identifier in the one or more historical transactions and the transaction can be the sequence of similar transactions discussed with respect to FIG. 1 and FIG. 2. Indicating, in the generated features, that the set of transactions are successful if at least one transaction in the set of transactions was successful can be updating the statutes of the sequence of similar transactions discussed with respect to FIG. 1 and FIG. 2.

In some embodiments, the transaction is included in the set of transactions, and wherein generating the features based on the transaction data and the historical transaction data comprises determining that a status of the transaction indicates success and updating one or more corresponding statuses of one or more other transactions in the set of transactions, based on the status of the transaction indicating success. For example, the transaction is in the sequence of similar transactions as discussed above. In addition, if the transaction indicates success, the statutes of corresponding transactions in the sequence can be updated to indicate success accordingly, as discussed above.

In some embodiments, the features comprises one or more of a number of transactions, a number of distinct payment identifiers, deltas between timestamps of consecutive transactions, a number of transactions associated with a particular error code and/or a number of distinct payment identifiers whose associated transactions are associated with a particular error code, as discussed with respect to FIG. 1.

At 350, that the transaction is fraudulent is determined using a classification model, based on the generated features. For example, the classification model can be classifier 128 whereas the determination that the transaction is fraudulent can be fraudulent activity prediction 130 as shown in FIG. 1.

In some embodiments, the classification model comprises one or more of a rule-based decision tree, a random forest, a logistic regression model, a support vector machine, a neural network, a gradient-boosted tree classifier, or a Gaussian Naive Bayes classifier, as discussed with respect to classifier 128 shown in FIG. 1.

In some embodiments, the classification model is associated with one or more of the associated merchant or the associated time window. For example, a different classification model can be associated with each time window related to each merchant as discussed with respect to classifier 128 shown in FIG. 1.

In some embodiments, the transaction data is combined with the historical transaction data. For example, the combined transaction data and historical transaction data can be the aggregated transactions as discussed with respect to FIG. 1.

In some embodiments, the classification model has higher weights related to features indicative of higher risk, as discussed with respect to classifier 128 shown in FIG. 1.

Example Application Server

Figure 4:
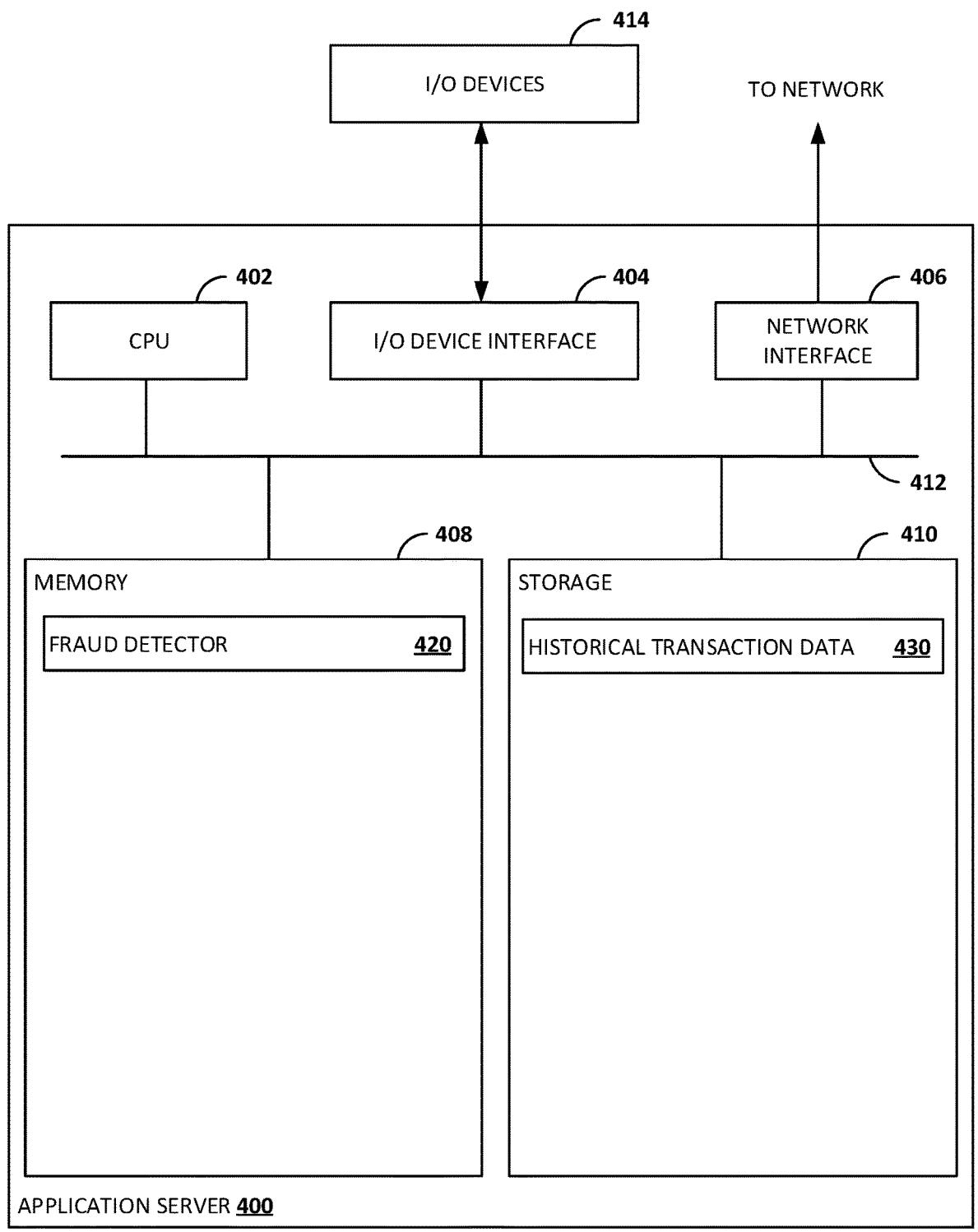
FIG. 4 depicts an example application server related to embodiments of the present disclosure.

FIG. 4 depicts an example application server 400, which can be used to fraud detector 100 of FIG. 1. As shown, application server 400 includes a central processing unit (CPU) 402, one or more input/output (I/O) device interfaces 404, which may allow for the connection of various I/O devices 414 (e.g., keyboards, displays, mouse devices, pen input, etc.) to application server 400, a network interface 406, a memory 408, a storage 410, and an interconnect 412.

CPU 402 may retrieve and execute programming instructions stored in memory 408. Similarly, CPU 402 may retrieve and store application data residing in memory 408. Interconnect 412 transmits programming instructions and application data, among CPU 402, I/O device interface 404, network interface 406, memory 408, and storage 410. CPU 402 is included to be representative of a single CPU, multiple CPUs, a single CPU having multiple processing cores, and the like. I/O device interface 404 may provide an interface for capturing data from one or more input devices integrated into or connected to application server 400, such as keyboards, mice, touchscreens, and so on. Memory 408 may represent a random access memory (RAM), while storage 410 may be a solid state drive, for example. Although shown as a single unit, storage 410 may be a combination of fixed and/or removable storage devices, such as fixed drives, removable memory cards, network attached storage (NAS), or cloud-based storage.

As shown, memory 408 includes fraud detector 420. Fraud detector 420 may be the same as or substantially similar to fraud detector 100 of FIG. 1.

As shown, storage 410 includes historical transaction data 430. Historical transaction data 430 may be the same as or substantially similar to historical electronic transaction data 112 of FIG. 1.

It is noted that the components depicted in application server 400 are included as examples, and other types of computing components may be used to implement techniques described herein. For example, while memory 408 and storage 410 are depicted separately, components depicted within memory 408 and storage 410 may be stored in the same storage device or different storage devices associated with one or more computing devices.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

What is claimed is:

1. A method, comprising:
   receiving transaction data indicative of a transaction;
   identifying, based on the transaction data, an associated merchant of one or more merchants and an associated time window of one or more time windows;
   receiving historical transaction data indicative of one or more historical transactions, wherein the one or more historical transactions are associated with the associated merchant and the associated time window;
   generating features based on the transaction data and the historical transaction data, wherein generating the features comprises:
     identifying a set of transactions associated with a given payment identifier in the one or more historical transactions and the transaction, wherein the set of transactions, includes at least one failed transaction;
     identifying at least one successful transaction in the set of transactions; and
     indicating, in the generated features, that all transactions in the set of transactions, including the at least one failed transaction, are successful based on the identifying the at least one successful transaction in the set of transactions; and
   determining, using a classification model, that the transaction is fraudulent, based on the generated features, wherein the classification model has been trained through a supervised learning process by which parameters of the classification model were iteratively adjusted based on labeled training data.

2. The method of claim 1, wherein the transaction data or the historical transaction data comprises one or more of:
   one or more associated merchant identifiers;
   one or more payment identifiers;
   one or more timestamps of one or more transactions;
   one or more statuses of the one or more transactions; or
   one or more error codes associated with the one or more transactions.

3. The method of claim 1, wherein the features comprises one or more of:
   a number of transactions;
   a number of distinct payment identifiers;
   deltas between timestamps of consecutive transactions;
   a number of transactions associated with a particular error code; or
   a number of distinct payment identifiers whose associated transactions are associated with a particular error code.

4. The method of claim 1, wherein the classification model comprises one or more of a rule-based decision tree, a random forest, a logistic regression model, a support vector machine, a neural network, a gradient-boosted tree classifier, or a Gaussian Naive Bayes classifier.

5. The method of claim 4, wherein the classification model is associated with one or more of the associated merchant or the associated time window.

6. The method of claim 1, further comprising combining the transaction data with the historical transaction data.

7. The method of claim 1, wherein the classification model has higher weights related to features indicative of higher risk.

8. A system, comprising:
   a memory including computer executable instructions; and
   a processor configured to execute the computer executable instructions and cause the system to:
     receive transaction data indicative of a transaction;
     identify, based on the transaction data, an associated merchant of one or more merchants and an associated time window of one or more time windows;
     receive historical transaction data indicative of one or more historical transactions, wherein the one or more historical transactions are associated with the associated merchant and the associated time window;
     generate features based on the transaction data and the historical transaction data, wherein generating the features comprises:
       identifying a set of transactions associated with a given payment identifier in the one or more historical transactions and the transaction, wherein the set of transactions includes at least one failed transaction;

identifying at least one successful transaction in the set of transactions; and indicating, in the generated features, that all transactions in the set of transactions, including the at least one failed transaction, are successful based on the identifying the at least one successful transaction in the set of transactions; and determine, using a classification model, that the transaction is fraudulent, based on the generated features, wherein the classification model has been trained through a supervised learning process by which parameters of the classification model were iteratively adjusted based on labeled training data.

9. The system of claim 8, wherein the transaction data or the historical transaction data comprises one or more of:
one or more associated merchant identifiers;
one or more payment identifiers;
one or more timestamps of the one or more transactions;
one or more statuses of the one or more transactions; or
one or more error codes associated with the one or more transactions.

10. The system of claim 8, wherein the features comprises one or more of:
a number of transactions;
a number of distinct payment identifiers;
deltas between timestamps of consecutive transactions;
a number of transactions associated with a particular error code; or
a number of distinct payment identifiers whose associated transactions are associated with a particular error code.

11. The system of claim 8, wherein the classification model comprises one or more of a rule-based decision tree, a random forest, a logistic regression model, a support vector machine, a neural network, a gradient-boosted tree classifier, or a Gaussian Naive Bayes classifier.

12. The system of claim 11, wherein the classification model is associated with one or more of the associated merchant or the associated time window.

13. The system of claim 8, further comprising combining the transaction data with the historical transaction data.

14. The system of claim 8, wherein the classification model has higher weights related to features indicative of higher risk.

15. A non-transitory computer readable medium comprising instructions to be executed in a computer system, wherein the instructions when executed in the computer system cause the computer system to:

receive transaction data indicative of a transaction;

identify, based on the transaction data, an associated merchant of one or more merchants and an associated time window of one or more time windows;

receive historical transaction data indicative of one or more historical transactions, wherein the one or more historical transactions are associated with the associated merchant and the associated time window;

generate features based on the transaction data and the historical transaction data, wherein generating the features comprises:

identifying a set of transactions associated with a given payment identifier in the one or more historical transactions and the transaction, wherein the set of transactions includes at least one failed transaction;

identifying at least one successful transaction in the set of transactions; and indicating, in the generated features, that all transactions in the set of transactions, including the at least one failed transaction, are successful based on the identifying the at least one successful transaction in the set of transactions; and determine, using a classification model, that the transaction is fraudulent, based on the generated features, wherein the classification model has been trained through a supervised learning process by which parameters of the classification model were iteratively adjusted based on labeled training data.

16. The non-transitory computer readable medium of claim 15, wherein the classification model comprises one or more of a rule-based decision tree, a random forest, a logistic regression model, a support vector machine, a neural network, a gradient-boosted tree classifier, or a Gaussian Naive Bayes classifier.

17. The non-transitory computer readable medium of claim 15, wherein the classification model is associated with one or more of the associated merchant or the associated time window.

* * * * *